United States Patent Office 3,339,426
Patented Sept. 5, 1967

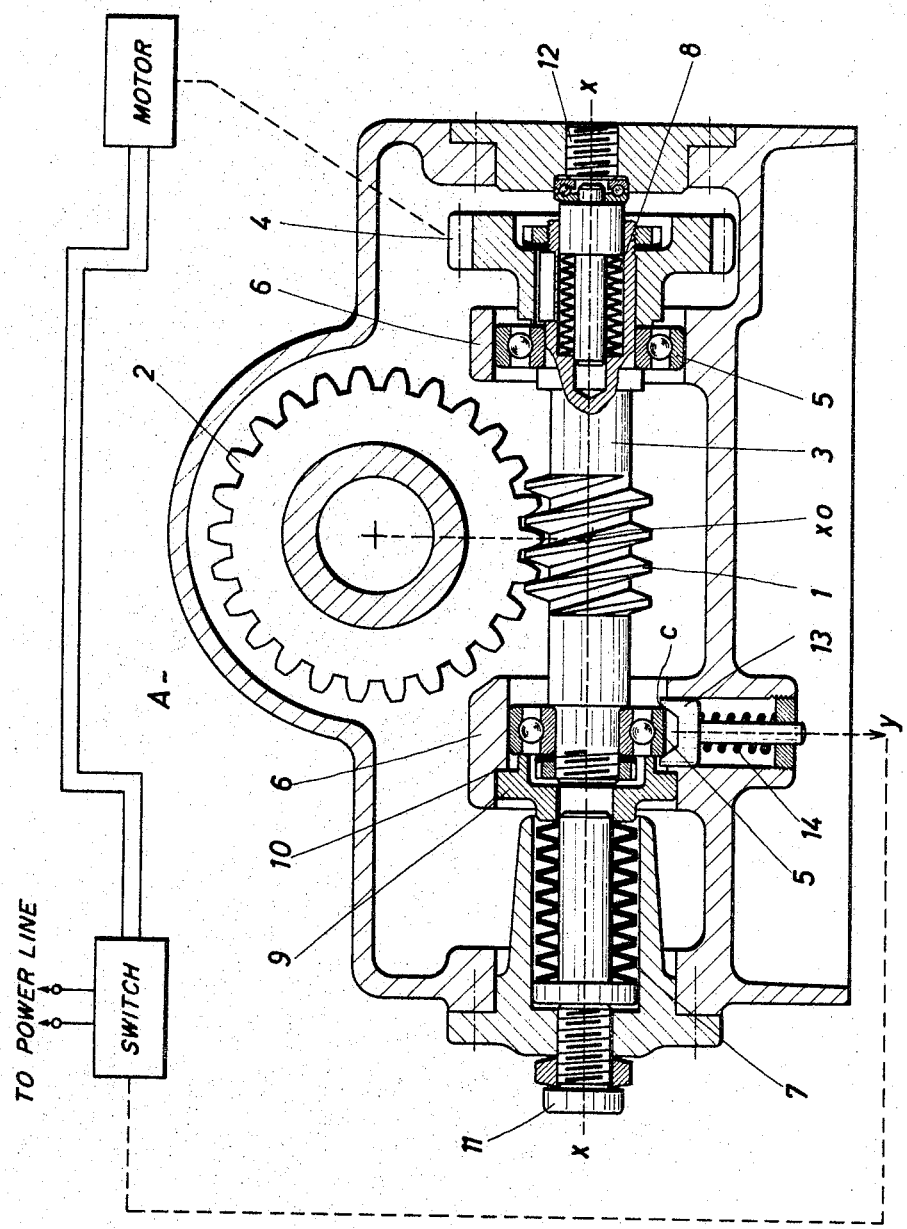

3,339,426
VALVE ACTUATOR
Karl-Heinz, Borggräfe, Ratingen, Germany, assignor to Siebeck-Metallwerk G.m.b.H., Ratingen, Germany, a corporation of Germany
Filed Apr. 23, 1965, Ser. No. 450,545
Claims priority, application Germany, Apr. 25, 1964, S 90,785
7 Claims. (Cl. 74—425)

ABSTRACT OF THE DISCLOSURE

An actuator having a reversible motor driving a worm supported for bidirectional axial motion against a pair of opposed springs which resist the axial thrust of the worm in driving a gear wheel against the influence of a load force. Upon occurrence of a given gear wheel load value, which can be the same or a different value for each direction, the worm is displaced against the corresponding spring to engage and displace a follower that actuates a switch to stop the motor and preclude further driving of the gear wheel into an overload condition.

---

This invention relates in general to actuators, and more particularly to a rotary actuator for effecting mechanical responses in a load, such as a valve, and having self-contained, automatic drive disengagement.

The load characterstics typical of such load systems as limited displacement valves, gates, etc., which are driven against mechanical stops, present a severe hazard to the reliability and survival of the prime mover or motor in any actuator used for driving them, unless appropriate means are provided for quickly disengaging such motor whenever the load resistance exceeds a safe value, as when for example, a valve gate is driven up against either a fully open or a competely closed position limit stop.

The actuator according to the instant invention is particularly adapted for driving such load systems as limited displacement valves, and utilizes a power transmission means connected to transmit forces to the load in which a translated force corresponding in direction and proportional in magnitude to the instantaneous force transmitted to the load is exerted upon one drive element in the power transmission means. This drive element is disposed for limited displacement along a given path under the influence of such translated forces.

Resilient means are provided for opposing the displacement of said drive element by the translated forces, so that the displacement of said drive element along the given path relative to a reference point thereon, such as for example, a reference point corresponding to zero load force, is proportional to the magnitude of the instantaneous load force, with the direction of said displacement relative to the reference point corresponding to the direction of the load force transmitted. Thus, the instantaneous load force is mechanically translated into a displacement of a drive element in the power transmission means in order to provide a means for sensing both the magnitude and direction of said instantaneous load force transmitted by the power transmission means of the actuator according to the instant invention, without any interference or interruption in the normal force transmission to the load thereby.

This drive element displacement is used for controlling a switch to disengage a motor means normally operatively engaged with the power transmission means whenever said drive element displacement corresponds to an instantaneous load force above a selected magnitude in either of two load force directions.

Such switch controlled disengagement is achieved by means of a cam member operatively connected to said drive element for simultaneous displacement therewith, and a follower disposed for engagement by said cam member, said follower being moved along a second given path by said cam member whenever the displacement of said drive element along its given path corresponds to an instantaneous load force above a selected magnitude. The switch is operatively connected to the follower and responsive to the movement thereof along its assigned path to disengage the motor means.

Thus, by reason of the over-all response of the motor disengagement switch to the displacement of the drive element along its given path as provided via the cam and follower, the actuator of the instant invention automatically limits the maximum load force transmitted to a selected magnitude in each of two load force transmission directions, and thereby protects the motor means from damage or destruction.

For purposes of example and illustration, the actuator according to the invention is exemplified as a rotary actuator for a valve, and having a power transmission means in the form of a worm drive, in which the worm shaft is axially displaceable against the elastic forces exerted by springs.

Although valve actuators are known in which the driving is performed through a worm drive, with the worm shaft being driven by a drive motor and the worm gear member being connected to the operating shaft of the valve that is to be opened and/or closed, in such prior art valve actuators, difficulties arise due to the fact that the valve has to be opened and closed with a certain minimum force, but in order to prevent damage to the motor, the motor must be disconnected immediately if excessively high valve load resistance occurs. These difficulties are further compounded because the resistance to the opening and the closing of a valve is not always of the same magnitude in normal operation. As experience has shown, the greatest resistance occurs at the commencement of valve opening, since the valve to be opened often sticks to a certain extent or is seized shut. This resistance necessarily has to be overcome by the actuator drive means, but to protect the motor, the motor disconnecting device must nevertheless respond when excessively high resistance occurs either in the opening or the closing of the valve, such as may be caused by foreign bodies which get into its fluid lines.

The requirement thus exists that, when the drive is started, an actuating moment must be available which is greater than the torque at which the drive is shut off towards the end of the closing movement of the valve, in order that the valve gate may be lifted from its seat. To meet this requirement, the valve actuator of the instant invention is so constructed so as to be capable of providing a greater valve actuating moment to open the valve than the actuating moment provided for closing the valve, and protective means which will disconnect the drive motor when the maximum permissible valve actuating moment or torque, is exceeded, even if such actuating torque does not suffice to operate the valve, in order to prevent destruction of the actuator drive motor.

This sort of protection has been incorporated into certain prior art valve actuators. In one of such known actuators, two limit switches are provided by which the drive motor is disconnected when the maximum permissible load torque is exceeded. These limit switches are adjustable in their entirety against spring biasing forces, and are displaced as a result of the displacement of a drive shaft bearing a drive element.

While such limit switches can provide for disengaging the drive motor when either of two limit load torque conditions are attained, one limit being for forward load driving, and the other corresponding to reverse load driving, the displaceable drive element which controls the operation of these switches must necessarily travel unequal distances in each limit load torque case, where the selected limit load torques are unequal.

This unequal travel of the displaceable drive element in such a prior art actuator results from the use of equal springs to oppose the displacement of the drive element.

In the actuator according to the invention, by using unequal springs for opposing the displacement of the drive element, a drive element displacement of given magnitude in one direction relative to a reference point can be made to correspond to one selected load force, or torque, and a drive element displacement of the same magnitude, but in the opposite direction relative to the reference point can be made to correspond to a different selected load force or torque. Thus, in the actuator of the invention, a symmetrical displacement of the drive element about a fixed reference point on the path of its displacement can represent two distinctly different load force magnitudes. As will appear in greater detail hereinafter, this feature of the invention is particularly advantageous in that it permits a single follower which is moved by a cam connected for simultaneous movement with the displaceable drive element to operate a single switch for disengaging the drive motor whenever either one of two load force limits of different magnitude for each load drive direction has been attained.

Accordingly, the worm drive valve actuator of the invention, in which the worm shaft is displaceable axially against elastic forces, is therefore characterized in that these elastic forces are of different magnitude in each of two directions. The different load torques are thus represented by equal displacements of the worm and its drive shaft, with the displacement path of said worm and drive shaft remaining the same, and the displacement of the shaft in one direction works against a greater force than in the other direction for equal magnitude displacements. The advantage of the actuator according to the invention over those of the prior art lies in the fact that only one drive motor disconnecting device need be provided, because although different load torques in the two load drive directions can affect the operation of said motor disconnecting device, the length of the displacement movement of the worm and drive shaft is the same.

In accordance with the invention, it is especially expedient and hence preferable to use a worm having such a pitch that it is not self-locking. In this manner it is achieved that, after the motor has been disengaged or stopped, the worm returns under the effect of the elastic forces of the resilient means, such as springs, that opposed its original displacement, back to its position of rest at the reference point whereat the two elastic forces are equal. In this manner it is simultaneously brought about that, after the motor has been disengaged, the elastic force of the resilient means that opposes the displacement of the worm does not constantly work against the actuator.

In order that the worm may not be displaced when the drive motor is engaged, such as might occur by reason of the greater resilient force acting contrary to the smaller and opposite resilient force, in accordance with the invention, the displacement of the worm can be limited by a stop means in such a manner that the worm on its shaft assumes a middle position or reference position when at rest, said reference position or point corresponding to zero load force or torque.

It is therefore, an object of the invention to provide an actuator for effecting mechanical responses in a load and having self-contained, automatic drive disengagement overload protection means. Another object of the invention is to provide an actuator as aforesaid which can be used for transmitting forces to drive a load in either of two opposite directions, and wherein the automatic overload protection means is responsive to limit load conditions occurring in either of said directions.

Another and further object of the invention is to provide an actuator as aforesaid having an overload protection means which is responsive to selected limit load conditions of unequal magnitude in said opposite load drive directions.

A further object of the invention is to provide an actuator as aforesaid in the form of a rotary actuator which is adaptable for opening and closing hydraulic valves.

A further object of the invention is to provide a rotary valve actuator as aforesaid wherein a single switch means can be used for performing automatic drive disengagement upon occurrence of limit load force conditions in either valve drive direction, and for both directions.

Other and further objects and advantages of the invention will become apparent from the following detailed description and accompanying drawing in which:

The figure is a side view, partly in section, of an actuator according to a preferred embodiment of the invention.

Referring now to the figure, the actuator A according to the invention is a rotary actuator, and is provided with a power transmission including a worm 1 in operative engagement with a gear wheel 2, said worm 1 being fixedly mounted on a drive shaft 3 which also carries a gear 4 and is driven thereby. The gear 4 is operatively engaged by a similar gear (not shown) mounted on the shaft of a motor (not shown) which serves for rotatably driving said gear wheel 2 by power transmission through the gear 4, shaft 3 and worm 1.

To effect mechanical responses in a load (not shown) such as a valve (not shown), the gear wheel 2 is operatively connected thereto for transmitting forces, or torgue to effect said mechanical responses therein when the gear wheel 2 is driven by the worm 1. In the case of the rotary actuator A, such mechanical responses can be effected in either of two opposite load drive directions, such as for example, a forward and a backward direction.

The worm 1 and its affixed shaft 3 are disposed for limited axial displacement along the path defined by the line X—X under the influence of translated forces corresponding in magnitude to the magnitude of the instantaneous force transmitted to the load (not shown) by the gear wheel 2, and corresponding in direction to the direction of said force transmission.

As is commonly known in mechanics, helical gear transmissions, such as exemplified by the worm 1 and gear wheel 2 in the instant invention, are subjected to reaction forces or thrusts as the result of torque transmitted by their relative movement. In general, the magnitudes of such reaction thrust forces are proportional to the magnitudes of the torques transmitted, and said thrust forces correspond in direction to the direction of torque transmission.

For the particular case of the worm 1 and gear wheel 2 transmission in which the rotary power of the worm is transmitted at a right angle to its axis of rotation to the gear wheel 2, the torque on said gear wheel 2 and hence the torque delivered to the load is equal to the product of the tangential force existing at the point of engaging contact of said worm 1 and gear wheel 2 and the effective radius of said gear wheel 2. Since the gear wheel 2 radius is a known constant in any practical construction of the actuator A, the worm 1 and shaft 3 will be acted upon by a translated force equal in magnitude to said tangential gear wheel 2 force, and proportional to the magnitude of the torque transmitted to the load.

For example, in the case of a gear wheel having a two inch effective radius, a clockwise torque of 100 pounds transmitted to said gear wheel 2 when the worm 1 is constrained against axial motion will result in a thrust of 50 pounds acting upon said worm 1 and shaft 3 in a direction parallel to the line X—X and toward the right in FIG. 1. Similarly, a counterclockwise torque of the same magnitude will produce a 50-pound thrust on the worm 1 and shaft 3, but rather this force will be directed toward the left in FIG. 1 and is parallel to the line X—X.

As can be seen in FIG. 1, the worm shaft 3 is mounted in a pair of ball bearings 5 for support by friction guide 6. The outer races of the ball bearings 5 are displaceable axially together with the worm 1 and shaft 3 in the friction guides 6, under the influence of the translated forces corresponding to the torque transmitted to the gear wheel 2.

Resilient means in the form of the springs 7 and 8 are provided for opposing this displacement of the worm 1 along the line X—X so as to limit the displacement of said worm 1 in each direction along said line X—X relative to a reference point $X_0$ thereon to magnitudes which are proportional to the magnitude of the instantaneous load torque in the forward and backward load drive directions of the gear wheel 2.

For example, in the case of compression springs 7 and 8 having elastic deformation constants of 240 and 200 pounds per inch respectively, a clockwise torque of 100-inch pounds on a two-inch radius gear wheel 2 will produce a 50-pound thrust opposed by the spring 8, to compress it 0.25 inch, and thus maintain the worm 1 in axial equilibrium at a position displaced 0.25 inch to the right of the zero torque reference position $X_0$. Similarly, a counterclockwise torque of 120-inch pounds on the gear wheel will produce a 60-pound thrust opposed by the spring 7, which will be compressed thereby to the extent of 0.25 inch, and thus will maintain the worm 1 in axial equilibrium at a position displaced 0.25 inch to the left of the reference position $X_0$.

As can be appreciated by the artisan, by providing springs 7 and 8 having selected different deformation characteristics, the worm 1 can be displaced the same distance away from the reference position $X_0$ in response to load torques of different magnitudes in the clockwise and counterclockwise directions. Thus, for example, in an application of the invention wherein it is desired to disengage the drive motor (not shown) whenever the load torque reaches 100-inch pounds in the clockwise direction, and wherein a counterclockwise load torque of 120-inch pounds could be tolerated before the motor need be disengaged, the aforesaid compression springs 7 and 8 could be advantageously used in conjunction with a symmetrically operated motor disengagement means.

According to the invention, such a symmetrically operated motor disengagement means can be provided in the form of a cam member, follower, and switch combination wherein the switch is operated by the movement of the follower in response to the movement of the cam to disengage the motor. For example, the outer race C of the left bearing 5 which is displaceable simultaneously with the worm 1, can be utilized as a cam to move a follower 13 in the direction Y whenever the displacement of the worm 1 in either direction along the line X—X corresponds to an instantaneous load torque above a selected magnitude for the load torque direction corresponding to said worm 1 displacement. The follower 13 is provided with symmetrically arranged opposing engagement faces disposed for engagement by the cam-like outer race C. As can be seen more clearly in FIG. 1, whenever the worm 1 moves to the right or to the left of the reference position $X_0$, the cam C will push the follower 13 in the direction Y against the effect of the spring 14. The amount of axial displacement of the worm 1 which can occur before the follower 13 is displaced in the Y direction will depend in general upon the separation of the opposing inclined engagement faces of said follower 13 and the inclination of said opposing engagement faces with respect to the cam C.

Hence, the magnitude of the instantaneous load torque exerted by the gear wheel 2 is translated into a thrust force acting on the worm 1 and opposed by a corresponding spring 7 or 8 force to translate said thrust force into a worm 1 displacement relative to the reference point $X_0$. This worm 1 displacement is in turn translated into a displacement of the follower 13 by the action of the cam C whenever the maximum load torque selected for each direction is attained, regardless of whether this maximum load torque be attained in the forward or the backward load drive direction.

The displacement of the follower 13, which in effect is a mechanical indication of the occurrence of a limit load torque can be utilized to disengage the motor (not shown). To accomplish this, a conventional switch (not shown) is operatively connected to the motor (not shown) and to the follower 13 so as to be responsive to the movement thereof along the direction Y to disengage said motor (not shown) whenever the instantaneous load torque on the gear wheel 2 is equal to a selected limit load torque in either load drive direction.

As will be appreciated by the artisan, from the foregoing disclosure and FIG. 1, the basic concept according to the invention of translating the instantaneous load torque into a displacement of one of the power transmission elements, such as the worm 1, and using that power transmission element displacement to control a motor disengagement means for disengaging the motor at a selected instantaneous load torque level can be embodied in a variety of forms, the particular preferred embodiment shown herein being only for purposes of example.

As indicated in FIG. 1, the plate springs 7 and 8, spring 7 being the stronger, can be used as resilient means for translating the instantaneous load torque of the gear wheel 2 into a worm 1 axial displacement, which for practical purposes must necessarily be limited in both directions. The displacement of the worm 1 to the right of the reference point $X_0$, i.e. against the effect of spring 8, is furthermore limited by the fact that spring 7 acts upon an intermediate piece 9 having a front side 10 which is applied under the pressure of spring 7 to a shoulder in the friction guide 6. In this manner it is brought about that spring 8 cannot be compressed by the stronger spring 7 until its force is equal to the force of spring 7.

The springs 7 and 8 can be preloaded by means of the screws 11 and 12 respectively in order that relatively small axial displacements of the worm 1 can represent larger load torque magnitudes than would otherwise be possible in the case of springs 7 and 8 which were not so preloaded.

In a typical advantageous application of the actuator A according to the instant invention wherein it is used for opening and closing a rotary valve (not shown), it can be assumed for purposes of example, that the gear wheel 2 is connected directly to rotate the valve stem (not shown) and that a clockwise rotation of said gear wheel 2 causes the valve to close, and a counterclockwise rotation of the gear wheel 2 causes the valve to open. Furthermore, it is assumed that the rotation of the valve stem is confined by mechanical stops within the valve to a rotation range between a fully opened valve position and a fully closed valve position.

When the valve in closing has reached the end position, i.e. the fully closed position, so that due to the resistance of the mechanical stop, the gear wheel 2 cannot turn any further, the worm shaft 3 is displaced toward the right, that is against the effect of the weaker spring 8. In this case the disengagement of the motor is brought about without the occurrence of excessive closing force which might result in making the valve stick, which would in turn make it difficult to open. If when the valve is opened, greater resistance should occur due to sticking or seizing, the worm shaft 3 is displaced towards the left along line X—X against the effect of the stronger spring 7. Spring 7 is compressed and aids the motor in its effort to open the valve. Only when the resistance is excessive, so that the worm shaft 3, after overcoming the force of spring 7, moves leftward over the pre-set axial distance required to displace the follower 13 to actuate the switch (not shown) is the motor shut off, or otherwise disengaged. After the disengagement of the motor, the worm 1 returns to its position of rest $X_0$. Thus after the motor is so disengaged, no further force is exerted on the gear wheel 2, so that manual or other action can be taken to release the stuck valve.

It should be noted that the actuator A of the invention need not be limited to driving valve loads or loads which are travel constrained by physical limit stops, but can be used generally wherever it is desired to disengage or shut off the drive motor means upon attaining a selected torque level in a given direction.

Where it is desired to disengage the motor means upon attaining a load torque limit level which is equal for both directions, the springs 7 and 8 can be equal. Where the load is to be driven only in one direction, the corresponding opposing spring 7 or 8 can be omitted, or replaced by a rigid cylinder member of the same free length.

It is understood that in cases where it is desired to provide by-directional load rotation (the load is rotated only in one direction at a time), a reversible motor means, such as one including a reversible electric motor, is used.

The term "switch," as used generally herein is intended to mean any conventional device such as an electrical circuit breaker or contacter, clutch, pilot valve, etc., which will function to either shut off the motor in response to the movement of the follower 13, or otherwise disengage it and thereby prevent the transmission of an excessive force or torque which might damage the motor, the worm 1 and gear wheel 2 power transmission, or even the load itself. Furthermore, in accordance with the invention, it is not absolutely necessary that the actuator A be designed as a rotary actuator A, but simply by replacing the gear wheel 2 with a linear gear rack (not shown), the actuator A can be adapted for pushing and/or pulling a load, in which case the motor will be automatically disengaged whenever the pushing or pulling force exerted by the rack (not shown) exceeds a selected value in either direction.

In accordance with the invention, the transmission of rotary power need not be confined to applications wherein the load is rotated at right angles to the rotation of the shaft 3, but by substituting a pair of mating helical gears (not shown) for the worm 1 and gear wheel 2, the actuator A can be adapted for rotating a load about an axis parallel to that of the shaft 3.

What is claimed is:

1. An actuator which comprises a reversible motor, a worm means including a worm mounted on a shaft and driven by said motor, said worm means being supported for limited axial displacement from a reference position in each of two opposing directions, a gear wheel disposed in meshing engagement with said worm for rotary displacement thereby against the influence of a load force, a first resilient means and a second resilient means each disposed to receive thrust forces exerted by said worm in displacing said gear wheel, and to resist the axial displacement of said worm means by such thrust forces, said first resilient means being disposed to resist axial displacement of the worm means in an axial direction corresponding to forward rotation of the gear wheel, and said second resilient means being disposed to resist axial displacement of the worm means in the opposite axial direction corresponding to backward rotation of the gear wheel, a follower disposed for engagement by said worm means and for displacement thereby along a predetermined path in accordance with the axial displacement of the worm means from said reference position, and a switch means connected to said motor and disposed for engagement by said follower to interrupt the operation of said motor whenever said follower displacement corresponds to a worm means displacement representing the thrust force required to rotate the gear wheel in the forward direction against a first predetermined limit load, and whenever said follower displacement corresponds to a worm means displacement representing the thrust required to rotate the gear wheel in the backward direction against a second predetermined limit load, said first and second limit load values being established by the elastic force-deformation characteristics of said first and second resilient means respectively, whereby whenever the load acting against said gear wheel reaches one of said limit values, the operation of the motor is interrupted to prevent further gear wheel rotation.

2. The actuator according to claim 1 wherein said follower is displaceable along its associated path in accordance with the magnitude of the worm means displacement and without regard to the direction thereof.

3. The actuator according to claim 1 wherein the first and second resilient means are springs, and including means for selectively preloading at least one of said springs to establish a selected elastic deformation-force characteristic therefor.

4. The actuator according to claim 1 wherein the first and second resilient means are springs having distinctively different elastic deformation-force characteristics.

5. The actuator according to claim 4 wherein the first and second springs have selectively interrelated elastic deformation-force characteristics to produce a worm displacement of equal magnitude about each side of the reference point in response to correspondingly directed load forces of selected unequal magnitudes.

6. The actuator according to claim 4 wherein the worm has a pitch and gear member engagement friction characteristics which enable said worm to be returned after displacement and disengagement of the motor means to the reference axial position by the opposing force of corresponding springs which resisted such worm displacement.

7. In combination with the actuator according to claim 1, a valve operatively connected to the gear member thereof.

References Cited

UNITED STATES PATENTS

| | | | |
|---|---|---|---|
| 1,437,017 | 11/1922 | Roberts | 74—425 |
| 1,761,921 | 6/1930 | Hutchinson | 74—425 |
| 1,829,249 | 10/1931 | Von Beulwitz | 74—425 |
| 2,793,630 | 5/1957 | Halik | 74—425 |
| 3,242,756 | 3/1966 | Fry | 74—425 |

OTHER REFERENCES

New Design Ideas, No. 111. In Design News, 13(8), page 29. Apr. 14, 1958.

DONLEY J. STOCKING, *Primary Examiner.*

MARK M. NEWMAN, *Examiner.*

L. H. GERIN, *Assistant Examiner.*